Nov. 20, 1956  J. M. MAPES  2,770,885
CONTACT INDICATOR FOR ADJUSTABLE SPHEROMETER
Filed Aug. 31, 1953  2 Sheets-Sheet 1

INVENTOR.
JOE M. MAPES
BY
*J. D. O'Brien*
*E. C. Walsh*
ATTORNEYS

Nov. 20, 1956  J. M. MAPES  2,770,885
CONTACT INDICATOR FOR ADJUSTABLE SPHEROMETER
Filed Aug. 31, 1953  2 Sheets-Sheet 2

INVENTOR.
JOE M. MAPES
BY
ATTORNEYS

United States Patent Office 2,770,885
Patented Nov. 20, 1956

2,770,885

CONTACT INDICATOR FOR ADJUSTABLE SPHEROMETER

Joe M. Mapes, China Lake, Calif.

Application August 31, 1953, Serial No. 377,741

3 Claims. (Cl. 33—172)

(Granted under Title 35, U. S. Code (1952), sec. 266)

The invention described herein may be manufactured and used by or for the Government of the United States of America for governmental purposes without the payment of any royalties thereon or therefor.

The present invention relates to an apparatus for indicating the exact instant of contact of one member with another member and has for one of its objects the provision of an improved contact indicator for a spherometer spindle.

In numerous applications, and most notably the spherometer, it is necessary to determine the moment of contact of two members. Thus, to enable an accurate determination of the radius of a spherical surface by the use of a spherometer, it is essential that means be included for gaging the exact moment of contact of the central spindle of the spherometer with the work surface so that distortion of the surface and the spindle at the point of contact does not introduce errors larger than the desired instrumental accuracy. In the past, spherometers have included various means for providing an indication upon the central spindle contacting the work surface. These prior means have generally comprised mechanical lever and/or gear systems for producing an amplified movement of an indicator, pneumatic systems including movable valves and pressure indicating instruments for providing an amplified indication of the movement of a work contacting pin relative to the central stem, or means for producing and observing distortion in a Newton's ring pattern between the work and the spindle. These prior mechanical and pneumatic arrangements were complex in construction, difficult to manipulate and read, required numerous intricate and delicate adjustments for proper operation, and, because of the great number of relatively moving parts, especially in the case of the lever or gear systems, were subject to errors, owing to working tolerances and wear, of such magnitude as to prevent their use in certain applications where radii determinations of great accuracy were required. While the prior indicating systems utilizing a Newton's ring pattern permitted measurements having a high degree of accuracy, they required complex and relatively expensive equipment, were difficult to set up and manipulate and, moreover, could not be employed to gage contact on surfaces where interference fringes could not be observed, as, for example, on the surface of a grinding tool.

The present invention provides an accurate contact indicator for spherometers which is simpler in construction and usage, requires a minimum of adjustment for proper operation, and which has a minimum number of relatively moving parts whereby inherent instrument errors are substantially reduced and spherometer maintenance problems are vastly simplified. The substance of the invention, as will hereinafter appear in greater detail, involves the provision of a liquid-filled capillary as the contact indicator. The capillary tube has provided thereon several folds of some material, such as glass or metal, to form a bellows. When compressed in a minute amount, the bellows causes the liquid column to rise in the tube by an amount proportional to the ratio of the average cross-sectional area of the bellows to the cross-sectional area of the capillary whereby to magnify the movement of a work contacting pilot pin on the spherometer spindle and thus provide an accurate indication of the moment of contact of the central spindle with the work surface.

In accordance with the foregoing, an object of the present invention is to provide an improved contact indicator.

Another object of the invention is to provide an improved contact indicator for spherometers which requires a minimum of adjustment for accurate gaging of the moment of contact of the central spindle of the spherometer with the work surface to be measured.

A further object is the provision of a simplified contact indicator for spherometers which has a minimum number of relatively moving parts whereby maintenance procedures are substantially reduced and radii determinations of greater accuracy may be accomplished.

Another object of the invention is to provide a contact indicator for adjustable spherometers wherein a liquid-filled capillary and bellows arrangement is employed for gaging the moment of contact of the spherometer central spindle with the work surface.

Other objects and many of the attendant advantages of the present invention will become apparent when the same becomes better understood from the following detailed description had in conjunction with the annexed drawings wherein.

Figure 1:
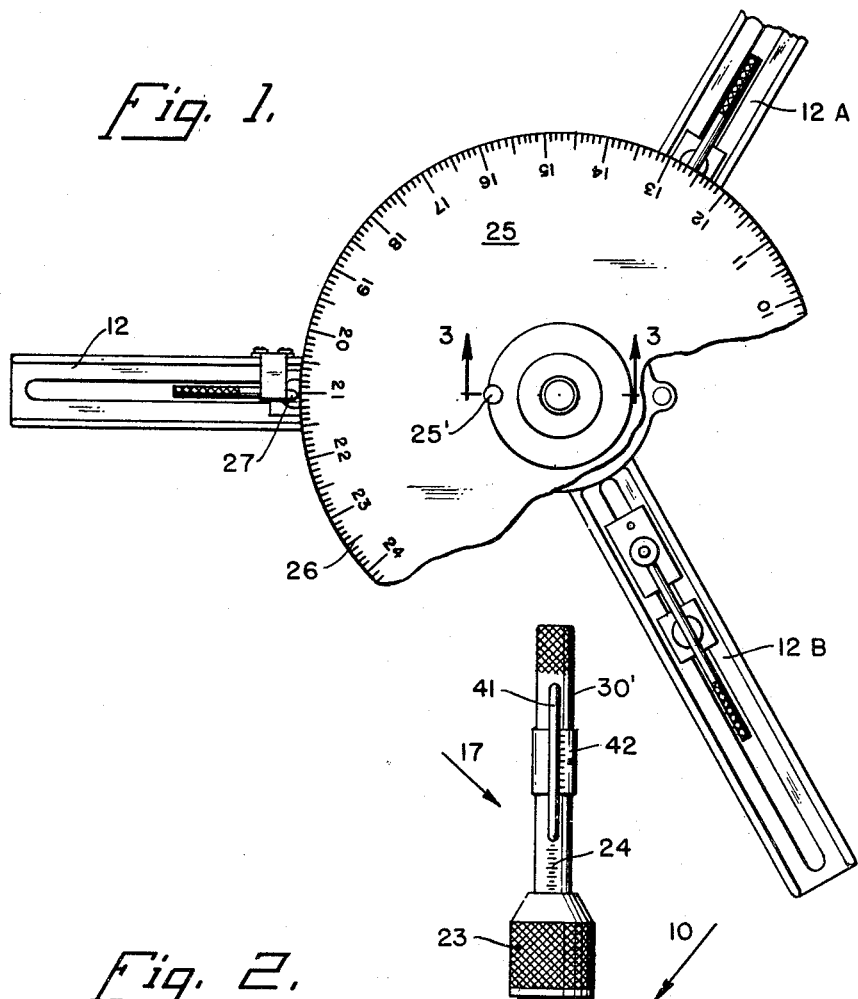
Fig. 1 is a plan view of a spherometer embodying the improved contact indicator of the present invention, parts being broken away for the sake of clarity.
Figure 2:
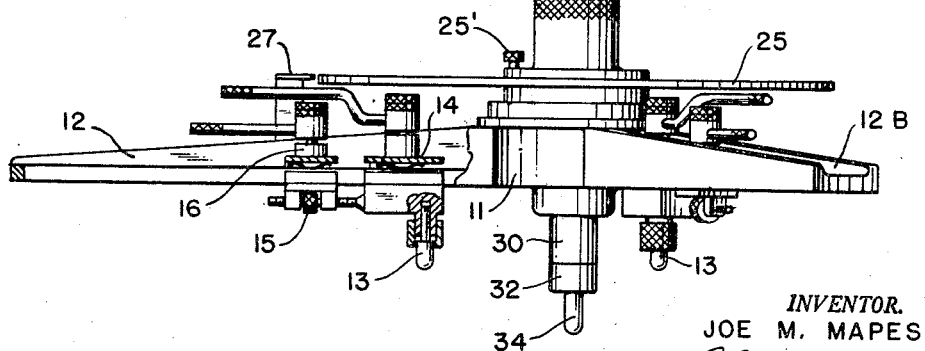
Fig. 2 is a side elevation partially in section of the spherometer of Fig. 1.

Referring to the drawings, and more particularly to Figs. 1 and 2 thereof, there is illustrated at 10 a spherometer comprising, in the conventional manner, a base 11 formed with three equiangularly spaced arms 12, 12a, and 12b, each having adjustably mounted thereon a supporting leg 13 formed with a spherical work contacting end surface as shown. Clamp means 14 are provided for securing each leg in its adjusted position on the respective one of the arms and a fine adjusting means, including a fine adjustment screw 15 and clamp means 16, may be provided if desired. Mounted in base 11 for movement along an axis perpendicular to the plane defined by the ends of said legs, and with respect to which axis said legs are adapted to be equidistantly disposed, is the central spindle of the spherometer, broadly designated at 17, which comprises the contact indicator of the present invention and which will be hereinafter described in greater detail. Spindle 17 has provided thereon a micrometer thread course 18 (Fig. 3) which engages a micrometer thread course 19 formed in a sleeve member 20, the latter being rotatably secured to base member 11 by an annular flanged member 21 secured to base member 11 as by means of screws, not shown. A bearing plate may be provided between sleeve 20 and base 11 as shown. Fixed to sleeve member 20 for rotation therewith is a knurled sleeve member 22. Sleeves 20 and 22 together provide a micrometer adjustment member the rotation of which effects axial movement of central spindle 17. Threadedly secured to the upper end of sleeve 22 is an adjustable element 23 which cooperates with a coarse micrometer scale 24, inscribed on stem 17, to indicate stem travel, element 23 providing for zeroing of the spherometer. A circular plate 25 is adjustably secured to micrometer adjustment member 22 and 20 for rotation therewith and bears thereon a fine micrometer scale 26 (Fig. 1) which cooperates with a pointer 27 on one of the arms 12 for providing a fine indication of stem travel. Plate 25 may be angularly adjusted as by loosening of screw 25' to zero scale 26. A slot 28 is provided in stem 17 and cooperates with a key 29 on base 11 to prevent rotation of stem 17 within base 11 while permitting axial movement of stem 17.

Figure 3:
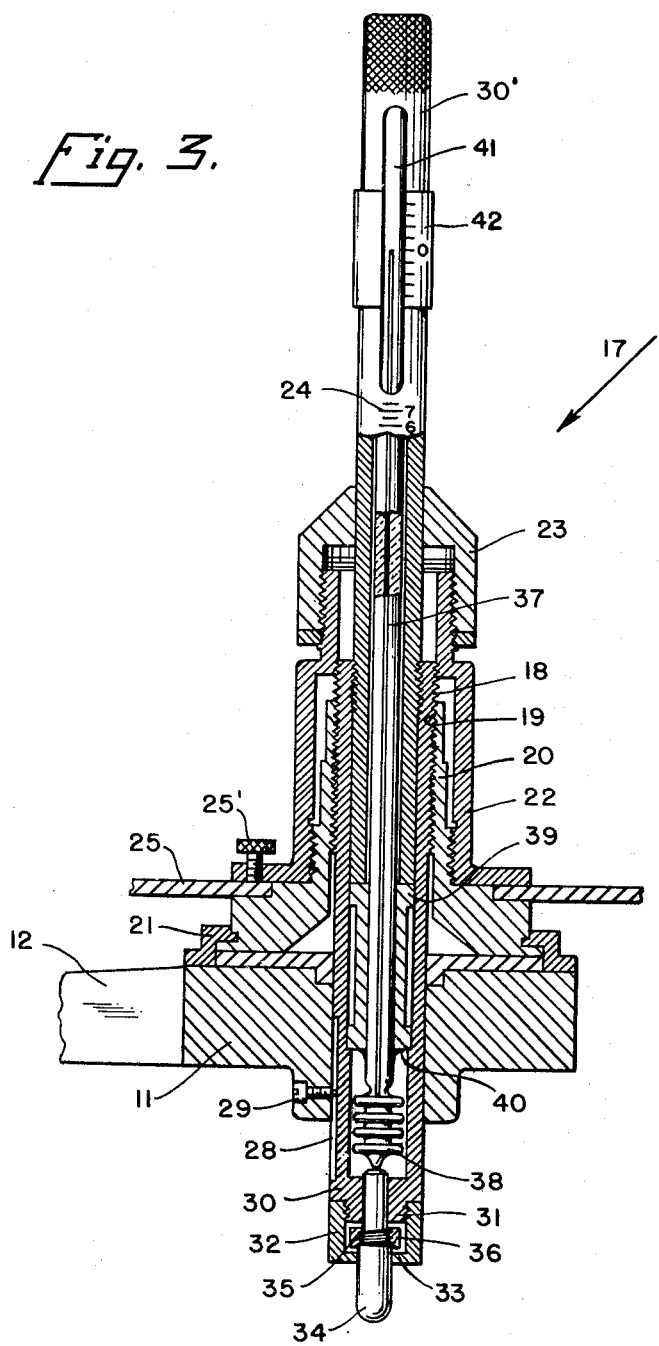
Fig. 3 is a sectional view taken substantially along line 3—3 of Fig. 1 and illustrating the details of the improved contact indicator of the present invention.

Referring now to Fig. 3 wherein there is illustrated, in greater detail, the contact indicator comprising the present invention, stem 17 comprises two cylindrical sections 30 and 30' which are threadedly secured together in telescoping fashion, the outer section 30 having the micrometer thread section 18 formed thereon. The lower end of section 30 has a threaded reduced portion 31 for receiving a sleeve member 32 formed with an inturned flange portion 33. Slidably disposed within an axial opening in the section 30 is a pilot pin 34 having an intermediate threaded section 35 to which is secured a collar 36 whereby the movement of pilot pin 33 is limited in one direction by reduced portion 31 and in the other direction by inturned flange 33. Axially disposed within sections 30 and 31 is a capillary tube 37 having formed on the lower end thereof a compressible chamber or bellows 38, which may be constructed in one piece with the capillary or made separately therefrom, and the lower end of which normally abuts pilot pin 34. Pin 34 permits the bellows 38 to be completely housed within stem 17, whereby it will be shielded against accidental blows and, to some degree, against changes in ambient temperature, and reduces the transfer of heat between the work piece and bellows which otherwise would reduce the inherent instrument accuracy. Collar 36 prevents compression of bellows 38 above its elastic limit, which is especially important in those indicators wherein the bellows is formed of glass in one piece with the capillary 37. Secured to capillary tube 37, as by cementing, is a cylindrical member 39, which engages the inner wall of stem section 30 to maintain the tube in coaxial relationship with said section, and which is clamped between the lower end surface of stem section 30' and a shoulder 40, formed in section 30, whereby to maintain tube 37 in fixed axial position in stem 17. An elongated slot 41 is provided in section 30' for viewing the meniscus of the fluid column within the capillary and aligning the latter with indicia formed on a movable scale member 42 axially adjustable on section 30'.

A spherometer incorporating the present contact indicator is employed in the following manner. The legs 13 are adjusted on arms 12 so as to be equidistant from the axis of stem 17 and spaced therefrom in accordance with the size and curvature of the object whose radius is to be determined. The spherometer is placed on a plane surface, for example, an optical flat, and the central spindle is lowered until some degree of contact is observed on the liquid column in capillary 37. Adjustable scale member 42 is moved axially of section 30' until its zero indication is aligned with the meniscus in the capillary. Both the gross scale 24 on spindle 17 and the fine scale 26 on plate 25 are read, if only difference readings are desired, or adjustable member 23 is rotated to bring its upper surface into alignment with the zero reading on scale 24 and plate 25 is adjusted to bring its zero reading in alignment with pointer 27, if absolute readings are desired. The spherometer is then placed on the object whose radius is to be determined, spindle 17 being retracted if said object has a convex surface, and the spindle 17 is then brought into engagement with the surface of said object, by rotation of micrometer adjustment member 22, to a position wherein the spindle pilot pin 34 contacts the work to exactly the same degree as on the optical flat which was used to set the zero, which may be accomplished by aligning the meniscus in capillary 37 with the zero reading on adjustable scale member 42. The gross scale 24 and the fine scale 26 are now read and are either used directly to determine the radius of curvature of the work piece, if the micrometer member 23 and scale plate 25 were adjusted to zero upon the zeroing of the spherometer, or when only difference readings are desired the original scale readings are subtracted from the later scale readings and the resultant figures are employed to determine the radius of curvature of the work piece.

From the foregoing, it will be apparent that the present invention provides a simple and yet accurate indicator, especially suited for use in spherometers, which indicator comprises a minimum number of components and relatively movable parts, is easily read and manipulated, and which requires relatively few and simple adjustments for proper operation.

Obviously many modifications of the present invention are possible in the light of the above teachings; thus, for example, the instant contact indicator may be adapted for use with devices other than pherometers. It is therefore to be understood that within the scope of the appended claims the present invention may be practiced otherwise than as specifically described herein.

What is claimed is:

1. A spherometer comprising a generally horizontal base member having three equiangularly spaced outwardly directed arms, a downwardly supporting leg carried by each arm mounted for adjustment therealong, whereby the lower ends of the legs may be disposed at the corners of equilateral triangles of various sizes, a vertically extending bore through the base member, the axis of the bore being at the geometric center of said triangles, a vertical tube slidably extending through said bore, means for preventing rotation of said tube in said bore, said tube having an external micrometer thread thereon, a sleeve surrounding said tube having an internal thread engaging said external thread, means mounting said sleeve on said base member for rotation relative thereto and for preventing axial movement of said sleeve in a direction of the axis of said bore, a circular plate mounted for rotation with said sleeve having equiangularly spaced fine micrometer graduations thereon adapted to be aligned with a stationary pointer, a capillary disposed within said tube affixed to and communicating with a bellows disposed adjacent its lower end, liquid filling said bellows and partially filling said capillary, a pilot pin sidably carried by said tube at the lower end thereof, one end of said pin adapted to abut the lower end of the belolws and the other end to contact a surface upon which the lower ends of said legs are adapted to abut, means for limiting axial movement of said pin to prevent application of pressure to said bellows sufficient to rupture same, said tube being apertured to permit viewing of the upper end of the liquid in said capillary, and an axially slidable member carried by said tube having indicia adapted to be aligned with the upper end of the liquid in said capillary.

2. Apparatus in accordance with claim 1, said disk being rotatable to any desired position relative to said sleeve, and including means for locking said disk to said sleeve at said desired position.

3. Apparatus in accordance with claim 1 including a coarse micrometer scale on said tube for indicating the approximate relative position of the lower end of said pin along the axis of said bore.

References Cited in the file of this patent

UNITED STATES PATENTS

| | | |
|---|---|---|
| 904,277 | Purington | Nov. 17, 1908 |
| 1,583,575 | Coberly | May 4, 1926 |
| 1,623,574 | Bryant | Apr. 5, 1927 |
| 2,010,144 | Dundon | Aug. 6, 1935 |
| 2,239,573 | Roberts | Apr. 22, 1941 |
| 2,472,126 | Robinson | June 7, 1949 |

FOREIGN PATENTS

| | | |
|---|---|---|
| 233,951 | Great Britain | May 21, 1925 |